United States Patent Office 3,267,045
Patented August 16, 1966

3,267,045
PROCESS FOR PREPARATION OF SINTERED METALLIC OXIDE CATALYST PELLETS
Albert J. Isacks, Jr., and Robert R. Lugg, Pensacola, Fla., assignors to Monsanto Company, St. Louis, Mo., a corporation of Delaware
No Drawing. Filed May 24, 1963, Ser. No. 282,863
7 Claims. (Cl. 252—473)

This invention relates to an improved process for the preparation of catalysts and more particularly to an improvement in the process for the preparation of pelleted metal oxide catalysts.

The ever increasing commercial need for synthetic chemicals makes necessary a continuing and expanding demand for improved processes for preparing high purity inorganic and organic materials; and this need for high volume, high yield commercial processes provides a continuing need for synthesizing chemicals by catalytic promoted reactions. One important organic material for which such a need exists is the chemical intermediate, hexamethylenediamine, which may be used, among other applications, in the commercial manufacture of synthetic polymers such as polyamides, polyester amides, and like materials. Commercial manufacture of hexamethylenediamine may be accomplished generally by the hydrogenation of adiponitrile in the presence of a pelleted metal oxide catalyst, and large scale production of the hexamethylenediamine necessitates large scale commercial production of the pelleted metallic oxide catalyst.

Commercial preparation of a suitable pelleted metallic oxide catalyst for hydrogenations, including the hydrogenation of adiponitrile to hexamethylene diamine, is well known in the art and comprises the steps of dissolving the chosen catalyst metal in nitric acid to form a metallic nitrate solution; precipitating the metal from the nitrate solution in the form of basic metallic carbonate; filtering and washing the precipitated basic metallic carbonate with water to remove any soluble salts; heating or calcining the filtered and washed basic metallic carbonate precipitate to a temperature of about 400° C. to form a mixture of metallic oxides; kneading the mixture of metallic oxides with water to give a dense paste; drying the paste; pulverizing or granulating the dry paste to form a powder of which 100 percent (%) passes through a 10 mesh U.S. standard screen; adding and thoroughly mixing from 1% to 5% by weight of a lubricant or sintering aid to the prepared powder; pelleting the mixture of powder and lubricant or sintering aid by suitable means to form pellets of a desired size and configuration; and sintering the resulting pellets in the presence of an oxygen-containing atmosphere at a temperature between 500° C. and 1100° C. for a period of 2 to 4 hours. It is obvious from this that the present processes for the preparation of the pelleted metallic oxide catalyst comprise many processing steps and much handling of catalytic materials which make them time consuming and expensive and, of necessity, give rise to objectionable losses in catalytic materials.

An object of the present invention is to provide an improved process for the preparation of pelleted metallic oxide catalyst.

Another object of the present invention is to provide an improved process for the preparation of pelleted metallic oxide catalyst which requires fewer handling and processing steps.

A further object of the invention is to provide an improved process for the preparation of metallic oxide catalyst which reduces markedly the loss of costly raw materials.

A still further object of the invention is to provide an improved process for the preparation of hydrogenation catalyst pellets.

These and other objects of this invention will be apparent from the description hereinafter.

In accordance with this invention it has been discovered that the above and other objects may be accomplished by preparing metallic oxide catalyst pellets by an improved process comprising the steps of dissolving the chosen catalyst metal in a suitable acid to form a soluble metallic salt solution; precipitating the metal from the salt solution in the form of a basic metallic carbonate; filtering and washing the precipitated basic metallic carbonate with water to remove any soluble salts; heating or calcining the filtered and washed basic metallic carbonate precipitate to a temperature between 300° C. and 500° C. to form a mixture of metallic oxides, mulling the mixture of metallic oxides with from 1% to 5% by weight of a lubricating sintering aid material; pelleting the mulled mixture of metallic oxides and lubricating sintering aid by suitable means to form pellets having effective surface area; and sintering the resulting pellets in the presence of an oxygen-containing atmosphere at a temperature between 500° C. and 1100° C. for a period sufficient to bring substantially all catalyst parts to a temperature sufficient for the desired strength and density.

The metal which may be used to prepare metallic catalyst pellets by the process of this invention to promote or activate hydrogenation reactions, including the hydrogenation of adiponitrile, may include those hydrogenating metals of group 8 and subgroup B of groups 1 and 2 in the periodic table either alone, in admixture, or combined with a difficultly reducible oxide of a metal or group 6 with cobalt and nickel being in greatest commercial favor as those metals used to prepare catalysts for the hydrogenation of adiponitrile.

In a preferred example of the preparation of sintered metallic oxide pellets for the catalytic hydrogenation of adiponitrile to hexamethylenediamine, cobalt in a purity of at least 97.0% is preferred as the metal to be used in the process of this invention.

Any suitable acid may be used to dissolve the catalyst metal chosen or the combination of the catalyst metals chosen, provided the acid will form a soluble salt with the catalyst metal or metals and will not introduce elements or combinations of elements which have a deadening effect upon the hydrogenation ability of the prepared catalyst. It is well known in the art that sulphur and chlorides, either alone or in combination with other elements, as well as oxides of sodium, potassium, manganese, and others, will have a deadening effect on the hydrogenation activity of metallic oxide catalysts; and those acids which may introduce these elements alone or in combination with other elements are not preferred for use to form the soluble metallic salt solution with the catalyst metal or metals chosen. In a preferred example of the preparation of sintered cobalt oxide catalyst pellets as a catalyst for the hydrogenation of adiponitrile to hexamethylenediamine, an aqueous solution of nitric acid may be used for forming the soluble cobalt nitrate solution. The concentration of the nitric acid in the aqueous solution should be sufficient to dissolve the cobalt metal completely, and the quantity of the aqueous solution of nitric acid needed to dissolve the cobalt metal completely is dependent upon the concentration of the aqueous nitric acid solution used.

The precipitation of the catalyst metal from the soluble salt solution in the form of a basic metallic carbonate may be effected by the addition of ammonium carbonate, ammonium bicarbonate, carbon dioxide, and ammonia or other metallic carbonate formers to the solution. The soluble metallic salt solution may or may not be diluted with demineralized water prior to the precipitation, and should it be desired to add catalyst promotors such as barium and silica, these or any other promotors may be added to the soluble metallic salt solution prior to the precipitation of the basic metallic carbonate. In a preferred example, the precipitation of the basic cobalt carbonate from an aqueous cobalt nitrate solution may be effected by the addition of ammonia to the solution in the presence of an excess of carbon dioxide. Care should be exercised during the precipitation of the basic cobalt carbonate to prevent high concentration of free ammonia which may result from a loss of carbon dioxide which dissolves more slowly than ammonia in the aqueous solution. Should this occur, digestion of the slurry of precipitate with additional carbon dioxide may be necessary to reduce cobalt amines which may be formed and will cause an attending yield loss.

The filtering and washing of the precipitated basic metallic carbonate with water may be effected by any suitable vacuum, pressure filtering or washing device well known in the art. In a preferred example, the precipitated slurry containing the basic cobalt carbonate may be filtered through a vacuum plate and frame filter press, and washing of the filter cake in the press should be thorough to avoid the retention of by-product ammonium nitrate which may decompose in subsequent steps of the process to form toxic and objectionable oxides of nitrogen. Excess water, if any, may be removed from the washed filter cake by any suitable means such as air blowing, if desired.

Heating or calcining of the filtered and washed basic metallic carbonate may be accomplished in one or more steps. Moisture may be removed from the washed basic metallic carbonate, and the dried basic metallic carbonate then may be heated for conversion to the mixture of metallic oxides. If desired, these steps may be combined depending upon the design and capacity of the ovens and igniters or other suitable heating apparatus. In a preferred example, the basic cobalt carbonate filter cake may be dried in a suitable drying oven of standard design for periods up to 8 hours. Following this, the dried basic cobalt carbonate may be placed in an igniter of a design well known in the art or other well-known heating devices designed to heat material to a temperature between 300° C. and 500° C., in an oxygen-containing atmosphere. In a preferred example, an igniter may consist of a heavily insulated chamber equipped with suitable ducts to distribute preheated air evenly to all parts of the insulated chamber and suitable means for heating the air and the inside of the insulated chamber to a temperature of at least 600° C.

Mulling of the resulting mixture of metallic oxides with a lubricating sintering aid to obtain proper densification and a substantially homogeneous mixing of the components may be accomplished by any suitable roller mill of the pan type well known in the art wherein the roll or rolls of the roller will operate through the mass of the mixture of metallic oxides and lubricating sintering aid. In general, roller mills of the pan type comprise a large wheel or wheels rolling in a circular path in a pan, and the pan may rotate with the wheel or wheels fixed or rotating in the same or opposite directions as the pan. The speed at which the pan and wheel or wheels may rotate relative to each other may be varied, and the distance or clearance between the pan bottom and the rotating wheel or wheels as well as the vertical loading, at any given clearance, applied to the mixture being mulled between the pan and the wheel or wheels rolling in a circular path may be varied also. To obtain proper densification and mixing of a mixture of metallic oxides and a lubricating sintering aid in accordance with this invention, it has been found that the clearance between the pan and rolling wheel or wheels may be between 0 and 0.50 inch., and the vertical loading applied to the mixture by the rolling wheel may be between 0 and 500 pounds or greater. The rate at which the wheel or wheels roll in the circular path in the pan may be varied within the limits of the design of the pan-type roller mill with the period required for proper mulling being directly proportional to the rate at which the wheel or wheels are rotated.

In a preferred example of the mulling of a mixture of cobalt oxides and a lubricating sintering aid in a pan-type roller mill in accordance with the process of this invention, homogeneous mixing and proper densification of the mixture may be obtained with a clearance between the rolling wheel and the pan of between 0 and ⅛ inch, a vertical loading on the wheel or wheels between 0 and 100 pounds or greater, and the wheel or wheels rolling in a circular path at a rate between 5 and 100 revolutions per minute relative to the pan.

The mulling time required for proper mixing and densification of the mixture of metallic oxides and lubricating sintering aid will vary depending upon the clearance between the pan of a mulling apparatus and the rotating wheel or wheels, the vertical load being applied to the wheels, and the rate at which the wheels are rolling in a circular path in the pan of a pan-type roller mill. In general, for efficient, economical mulling it may be preferred to operate the mulling device at minimum clearances and maximum wheel loadings and rotational rates, within the design and construction of the mulling apparatus, to have mulling times at a minimum and to obtain homogeneous, densified mixtures of the metallic oxides and the lubricating sintering aid.

In a preferred example, the mulling time for proper mixing and densification in accordance with the process of this invention may be from fifteen minutes to two hours in a pan-type roller mill for the mulling of a mixture of cobalt oxides with from 2% to 4% of a lubricating sintering aid when a batch of 5 to 500 pounds of the mixture is charged to a pan-type roller mill with 2 wheels set at a clearance between 0 and ⅛ inch, a vertical loading on each wheel between 0 and 500 pounds or greater, and having the wheels roll in a circular path at a rate relative to the pan of between 5 and 100 revolutions per minute.

The lubricating sintering aid which may be used in accordance with the process of this invention generally may be a solid at normal room temperatures which solid melts below the sintering temperature of the metallic oxide catalyst causing the granules of catalyst during the sintering to occupy a smaller space than the nonsintered catalyst. The lubricating sintering aid, during sintering, is substantially completely removed at the temperatures of sintering and leaves substantially no ash remaining in the sintered metallic oxide catalyst after sintering. Especially effective lubricating sintering aids are animal and vegetable stearins, and normally higher molecular weight fatty acids such as those acids containing more than 12 carbon atoms and including tridecylic, myristic, pentadecylic, and more particularly, palmitic and stearic acids or the esters thereof. The esters which may be used as lubricating sintering aids may include those esters which are solids at room temperature and fluid at temperatures below the sintering temperatures for the metallic oxide catalysts and may include esters such as glycolic, glyceryl, and similar polyhydric alcohol esters of the acids such as glyceryl tristearate, and glyceryl tripalmitate whether of the mono or polycarboxylate types. Simple esters such as the methyl, ethyl, propyl, and higher monohydric alcohol esters may be used, however, the results are not as outstanding. In a preferred example of the preparation of a sintered cobalt oxide catalyst, the lubricating sintering aid may be a vegetable stearin sold under the trademark "Sterotex"; and for the preparation of the mixture of metallic oxides and lubricating sintering aid, the chosen material to be used as lubricating sintering aid may be added to the mixture of cobalt oxides in a concentration of from 1% to 5% and preferably from 2% to 4% by weight of the mixture of cobalt oxides.

Following the mulling of the mixture of metallic oxides and the lubricating sintering aid, the densified, homogeneous mulled mixture may be pelleted by any suitable pelleting means to form pellets of the desired shape and configuration. The pellets thus formed may then be sintered in any suitable muffle furnace well known in the art. The sintering of the metallic oxide catalyst pellets may be in an oxidizing atmosphere at a temperature between 500° C. and 1300° C. for periods from 1 to 10 hours.

In a preferred example, a mulled mixture of cobalt oxides and from 2% to 4% by weight of a vegetable stearin lubricating sintering aid may be pelleted by means of a rotary pelleting machine to form substantially cylindrical pellets having a diameter between 0.10 inch and 0.50 inch and a height between 0.10 inch and 0.50 inch. The pellets thus prepared then may be sintered at a temperature between 700° C. and 1100° C. in a muffle furnace comprising a hollow cylindrical insulated vessel having electrical resistance heaters therein capable of supplying the required heat for proper sintering. Proper sintering of the cobalt oxide catalyst pellets above described may take from 3 to 6 hours at the above described conditions.

Proper densification of the mixture of metallic oxides and the lubricating sintering aid, prior to the pelleting of the mixture and the subsequent sintering thereof, is one of the more critical steps in a process for the preparation of the sintered catalyst pellets. It is well known in the art that when low density mixtures of metallic oxides are pelleted and sintered, catalyst pellets with low densities and a high degree of frangibility result. When an attempt is made to use catalyst pellets with a high degree of frangibility in hydrogenations or other catalytic processes, the catalyst pellets become crushed or broken and a major portion of the pellets become catalyst powder which will not permit gaseous or liquid reacting materials to pass therethrough readily causing the need for stopping the catalytic process.

It has been found from known processes for the preparation of sintered metallic oxide catalyst pellets that when the sintered catalyst pellets have a density of 1.75 grams per cubic centimeter to 3.25 grams per cubic centimeter, sintered metallic oxide catalyst pellets that retain their integrity in process applications are obtained. Further, it has been found that known processes, as well as the process of this invention, produce mixtures of metallic oxides from the step of heating or calcining the basic metallic carbonate at a temperature between 300° C. and 500° C. with a density of 0.50 gram per cubic centimeter to 0.75 gram per cubic centimeter. The mixture of metallic oxides with a density of 0.50 gram per cubic centimeter to 0.75 gram per cubic centimeter must, of necessity, be densified and mixed with a lubricating sintering aid if sintered catalyst pellets with a density of 1.75 grams per cubic centimeter to 3.25 grams per cubic centimeter are to be obtained.

The process of this invention which comprises the step of mulling the mixture of metallic oxides which results from the heating or calcining step of the process with a lubricating sintering aid to obtain proper densification of the mixture of metallic oxides may be better understood by reference to the following examples of a preferred embodiment, which are to be regarded as illustrative but not limitative.

Example I

A mixture of cobalt oxides obtained from calcining basic cobalt carbonate prepared in accordance with the procedures well known in the art and disclosed in the preceding description was added to a pan-type roller mill (Model LF Simpson "Mix-muller" manufactured by National Engineering Company) for mulling with 3%, by weight of the mixture of cobalt oxides, of Sterotex. (Sterotex is the tradename of a product of Capitol City Products Company and is specified as a vegetable stearin 100% of which passes through a U.S. standard 10 screen.) The clearance between the pan and the wheels rolling in a circular path was ⅛ inch and the effective vertical loading on each of two wheels in the roller mill was 68 pounds. The wheels were rotated relative to the pan at a rate of 44 revolutions per minute. Table 1 below shows the densification obtained by mulling a 15 and a 30 pound sample of a mixture of cobalt oxides and Sterotex.

TABLE 1

| | Sample 1 | Sample 2 |
|---|---|---|
| Pounds of mixture of cobalt oxides and Sterotex | 15 | 30 |
| Density at start, gm./cc | 0.71 | 0.71 |
| Density after 15 minutes mulling, gm./cc | 1.05 | 1.05 |
| Density after 30 minutes mulling, gm./cc | 1.20 | 1.15 |

As can be seen from Table 1, above, a density of between 1.15 and 1.20 grams per cubic centimeter was obtained for the mixture of cobalt oxides and Sterotex in 30 minutes of mulling. This density of the mixture of oxides and lubricating sintering aid is more than comparable to that of 1.20 grams per cubic centimeter which is obtained by processes known previously for densification of mixtures of cobalt oxides and lubricating sintering aids wherein the calcined basic cobalt carbonate is kneaded with water to give a dense paste; the resulting paste is dried and pulverized to give a powder 100% of which passes through a 10 mesh U.S. standard screen; and the resulting powder is mixed with 3% Sterotex.

Example II

A mixture of cobalt oxides obtained from calcining basic cobalt carbonate prepared in accordance with the procedures well known in the art and disclosed in the preceding description was added to a pan-type roller mill ("Porto-muller" manufactured by National Engineering Company) for mulling with 3%, by weight of the mixture of cobalt oxides, of Sterotex. The clearance between the pan and the wheels rolling in a circular path was ⅛ inch and the effective vertical loading on each of two wheels in the roller mill was 250 pounds. The wheels were rotated relative to the pan at a rate of 44 revolutions per minute. Table 2 below shows the densification obtained by mulling a 103 pound sample of a mixture of cobalt oxides and Sterotex.

TABLE 2

Pounds of mixture of cobalt oxides and Sterotex ___ 103
Density at start _____ gm./cc__ 0.5
Density after 30 minutes mulling _____ gm./cc__ 0.79
Density after 45 minutes mulling _____ gm./cc__ 1.34
Density after 60 minutes muling _____ gm./cc__ 1.45

As can be seen from Table 2, above, a density of 1.45 grams per cubic centimeter was obtained for the mixture of cobalt oxides and Sterotex in 60 minutes of mulling. This density of the mixture of oxides and lubricating sintering aid is more than comparable to that of 1.20 grams per cubic centimeter which is obtained by processes known previously for densification of mixtures of cobalt oxides and lubricating sintering aids wherein the calcined basic cobalt carbonate is kneaded with water to give a dense paste; the resulting paste is dried and pulverized to give a powder 100% of which passes through a 10 mesh U.S. standard screen; and the resulting powder is mixed with 3% Sterotex.

Example III

Mixtures of cobalt oxides were prepared by dissolving cobalt metal of at least 97% purity in 58% nitric acid; precipitating basic cobalt carbonate from the cobalt nitrate solution formed by the addition of ammonia and carbon dioxide to the nitrate solution; filtering the basic cobalt carbonate precipitate from the solution; water washing the filtered basic cobalt carbonate precipitate to avoid retention of ammonium nitrate; and heating the washed precipitate in an igniter at 400° C. until no carbon dioxide was evolved. Sintered cobalt oxide catalyst pellets in the form of 0.25 inch diameter and 0.25 inch high cylinders were prepared from the mixture of cobalt oxides by mulling the mixture individually with 3%, by weight, Sterotex in a pan-type roller mill described in Example II; pelleting the mulled material in a Stokes rotary pelleting machine; and sintering the prepared pellets at 650° C. to 850° C. for a period of four hours.

A portion of the mixture of cobalt oxides, as prepared above, was used to prepare sintered cobalt catalyst pellets of a substantially identical size for control by the steps of the process well known in the art wherein the mixture of cobalt oxides is kneaded with water; the kneaded mixture is dried at approximately 150° C. for twenty-four hours; the dried kneaded mixture is granulated to a particle size 100% of which passes through a 10 mesh U.S. standard screen; the granulated mixture is mixed with 3% Sterotex in a suitable mixer for at least 30 minutes; the resulting mix of cobalt oxides and Sterotex is pelleted in a Stokes rotary pelleting machine; and the prepared pellets are sintered at 1200° C. for a period of four hours. Tables 3 and 4 below, respectively, show a comparison of the density ranges of the cobalt mix at the end of each of the steps in the process of this invention and that of the process known in the art.

TABLE 3.—DENSITY RANGES AT STEPS IN PROCESS FOR PREPARATION OF SINTERED COBALT CATALYST PELLETS COMPRISING A MULLING STEP

| | Gm./cc. |
|---|---|
| (1) Density of mixture of cobalt oxides after ignition step of cobalt oxides | 0.50 to 0.72 |
| (2) Density of mulled mass comprising mixture of cobalt oxides and 3%, by weight, lubricating sintering aid | 1.05 to 1.5 |
| (3) Density of pellets prepared from mix of Item 2, above | 1.40 to 1.65 |
| (4) Density of sintered pellets of Item 3, above | 1.90 to 3.00 |

TABLE 4.—DENSITY RANGES AT STEPS IN PROCESS FOR PREPARATION OF SINTERED COBALT CATALYST PELLETS COMPRISING WATER KNEADING, DRYING, GRANULATION, MIXING, PELLETING, AND SINTERING STEPS

| | Gm./cc. |
|---|---|
| (1) Density of mixture of cobalt oxides after ignition of cobalt carbonate | 0.50 to 0.72 |
| (2) Density of mixture of cobalt oxides after kneading with water | 2.50 to 3.00 |
| (3) Density of Item 2 after drying | 2.0 to 2.5 |
| (4) Density of mixture of cobalt oxides of Item 3 after granulation and passage through 10 mesh U.S. standard screen | 1.20 to 1.40 |
| (5) Density of mixture of Item 4 above and 3%, by weight, of Sterotex | 1.20 to 1.40 |
| (6) Density of pellets formed from mixture of Item 5 | 1.40 to 1.65 |
| (7) Density of pellets of Item 6 after sintering | 2.06 to 3.05 |

As can be seen clearly from a comparison of the density data of Tables 3 and 4, above, sintered cobalt catalyst pellets are obtained with densities in the desired range by the process of this invention wherein at least three steps of the known process have been eliminated.

The activity of the sintered cobalt catalyst pellets with densities shown in Table 3, above, was equal to or greater than the activity of the pellets, the densities of which are shown in Table 4, when used for the hydrogenation of adiponitrile to hexamethylenediamine under substantially the same operating conditions. Also, no difference in the frangibility was noted for the sintered catalyst pellets as prepared by the process of this invention and the process well known in the art.

The advantages of the elimination of process steps are obvious. There is available by this invention a marked reduction in equipment and space, as well as labor and handling, necessary to accomplish that which was accomplished previously. Attending advantages are also obvious. A reduction in equipment and handling necessarily carries with it a direct reduction in investment and operating costs as well as a reduction in losses in catalytic materials. In the case of the preparation of sintered cobalt oxide catalyst pellets by the process of this invention, this reduction in losses of cobalt amounts to 5% or greater.

As many apparently widely different embodiments of this invention may be made without departing from the spirit and scope thereof, it is to be understood that we do not limit ourselves to the specific embodiments thereof except as defined in the appended claims.

What is claimed is:

1. A process for preparing metallic oxide catalyst pellets consisting essentially of, in combination, the steps of:
   a. dissolving a catalyst metal selected from the group consisting of the hydrogenating metals of group 8, and sub-group B of groups 1 and 2 of the Periodic Table, mixtures of said metals, and mixtures of said metals in combination with a difficultly reducible oxide of a metal of group 6, in an acid to form a soluble metallic salt solution;
   b. precipitating from the soluble metallic salt solution a basic metallic carbonate by the addition of ammonia and carbon dioxide thereto;
   c. recovering the precipitated basic metallic carbonate from the supernatant;
   d. washing the recovered precipitated basic metallic carbonate to remove soluble salts therefrom;
   e. heating the washed precipitate at a temperature between 300° C. and 500° C. for a period sufficient to form a mixture of oxides of said catalyst metal;
   f. dry mulling the mixture of metallic oxides in absence of water with from 1% to 5% by weight of an organic lubricating sintering aid material to form a substantially homogeneous mass having a density of at least 1 gram per cubic centimeter;
   g. pelleting the mulled mixture of metallic oxides and lubricating sintering aid material; and
   h. heating the resulting pellets in an oxygen-containing atmosphere at a temperature between 500° C. and 1300° C. for a period of 1 to 10 hours whereby sintered metallic oxide catalyst pellets having a density between 1.75 and 3.25 grams per cubic centimeter are obtained.

2. The process of claim 1 wherein the said catalyst metal is cobalt.

3. The process of claim 1 wherein the said acid is nitric acid.

4. The process of claim 1 wherein the said lubricating sintering aid material is at least one of the group of materials consisting of fatty acids containing more than 12 carbon atoms, and esters of fatty acids containing more than 12 carbon atoms including animal and vegetable stearins.

5. The process of claim 1 wherein the said period of heating between 300° C. and 500° C. to form said mixture of metallic oxides is between 1 and 8 hours.

6. A process for preparing sintered cobalt oxide catalyst pellets having a density between 1.75 and 3.25 grams per cubic centimeter consisting essentially of the steps of (A) dry mulling a mixture of cobalt oxides in absence of water with from 1 percent to 5 percent by weight of an organic lubricating sintering aid material to form a substantially homogeneous mass having a density of at least 1 gram per cubic centimeter; (B) pelleting the mulled mixture of metallic oxides and lubricating sintering aid material; and (C) heating the resulting pellets in an oxygen-containing atmosphere at a temperature between 500° C. and 1300° C. for a period of 1 to 10 hours whereby sintered metallic oxide catalyst pellets having a density between 1.75 and 3.25 grams per cubic centimeter are obtained.

7. The process of claim 6 wherein said mulling step is conducted in a pan-type roller mill comprising a pan and at least one wheel rolling in a circular path relative to said pan.

References Cited by the Examiner
UNITED STATES PATENTS

| | | | |
|---|---|---|---|
| 2,209,492 | 7/1940 | Spicer | 252—473 |
| 2,211,208 | 8/1940 | Ipatieff et al. | 252—472 |
| 2,570,882 | 10/1951 | Stiles | 252—472 X |
| 2,776,315 | 1/1957 | Jefferson et al. | 252—459 X |
| 2,815,331 | 12/1957 | Ashley et al. | 252—472 X |
| 3,152,997 | 10/1964 | Natta et al. | 252—470 |
| 3,198,748 | 8/1965 | Keith et al. | 252—473 X |

OSCAR R. VERTIZ, *Primary Examiner.*

BENJAMIN HENKIN, *Examiner.*

G. OZAKI, *Assistant Examiner.*